United States Patent
Sadakane et al.

(10) Patent No.: US 10,981,358 B2
(45) Date of Patent: Apr. 20, 2021

(54) LAMINATED GLASS

(71) Applicant: AGC Inc., Tokyo (JP)

(72) Inventors: Shunsuke Sadakane, Tokyo (JP); Yoshinori Iguchi, Tokyo (JP); Naruki Yamada, Tokyo (JP); Tokihiko Aoki, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/369,160

(22) Filed: Mar. 29, 2019

(65) Prior Publication Data

US 2019/0299752 A1 Oct. 3, 2019

(30) Foreign Application Priority Data

Apr. 3, 2018 (JP) .............................. JP2018-071768
Feb. 18, 2019 (JP) .............................. JP2019-026359

(51) Int. Cl.
*B32B 17/10* (2006.01)
*B60J 1/00* (2006.01)
*B60K 35/00* (2006.01)

(52) U.S. Cl.
CPC .. *B32B 17/10348* (2013.01); *B32B 17/10036* (2013.01); *B32B 17/10541* (2013.01); *B32B 17/10559* (2013.01); *B32B 17/10761* (2013.01); *B60J 1/001* (2013.01); *B32B 2250/03* (2013.01); *B32B 2250/40* (2013.01); *B32B 2605/006* (2013.01); *B60K 35/00* (2013.01); *B60K 2370/1529* (2019.05); *B60K 2370/785* (2019.05)

(58) Field of Classification Search
CPC .... B32B 17/10348; B32B 17/10–1099; B32B 17/10568; B60J 1/00–002; B60J 1/02
See application file for complete search history.

(56) References Cited

U.S. PATENT DOCUMENTS

| | | | | |
|---|---|---|---|---|
| 5,999,314 | A | * | 12/1999 | Asakura .............. G02B 5/3066 359/485.02 |
| 6,042,924 | A | * | 3/2000 | Paulus ............. B32B 17/10036 428/77 |
| 6,259,559 | B1 | * | 7/2001 | Kobayashi ........ B32B 17/10036 359/485.02 |

(Continued)

FOREIGN PATENT DOCUMENTS

| EP | 0836108 A2 * | 4/1998 | ......... G02B 27/0101 |
|---|---|---|---|
| JP | 2006-512622 A | 4/2006 | |

(Continued)

OTHER PUBLICATIONS

JIS standard R3212 (Year: 2016).*

*Primary Examiner* — Z. Jim Yang
(74) *Attorney, Agent, or Firm* — Foley & Lardner LLP (57) ABSTRACT

A laminated glass has a vehicle exterior side glass plate; a vehicle interior side glass plate; and an intermediate film disposed between the vehicle exterior side glass plate and the vehicle interior side glass plate. The laminated glass includes a display area for reflecting a projected image projected from vehicle interior, to display information. In at least a part of the display area, a film is arranged between the vehicle exterior side glass plate and the vehicle interior side glass plate. The film is a main reflection surface for the projected image. The display area is offset from the edge of the film by 5 mm.

16 Claims, 8 Drawing Sheets

(56) References Cited

U.S. PATENT DOCUMENTS

| | | | | |
|---|---|---|---|---|
| 6,327,089 B1* | 12/2001 | Hosaki | ............. | B32B 17/10018 |
| | | | | 324/244.1 |
| 2004/0135742 A1* | 7/2004 | Weber | ................... | G02B 5/305 |
| | | | | 345/7 |
| 2011/0228403 A1* | 9/2011 | Masuda | ............. | G02B 27/0018 |
| | | | | 359/630 |
| 2014/0240998 A1* | 8/2014 | Richard | ............ | B32B 17/10541 |
| | | | | 362/510 |
| 2016/0075111 A1* | 3/2016 | Dixon | ............... | B32B 17/10761 |
| | | | | 428/172 |
| 2016/0257095 A1* | 9/2016 | Cleary | ................. | B32B 17/064 |
| 2017/0242247 A1* | 8/2017 | Tso | ............................ | B60J 1/02 |
| 2017/0343806 A1* | 11/2017 | Anzai | ................ | G02B 27/0101 |
| 2017/0361576 A1* | 12/2017 | Legrand | ............ | B32B 17/10036 |
| 2017/0361687 A1* | 12/2017 | Chen | .................... | G02B 5/3033 |
| 2018/0162104 A1* | 6/2018 | Chamberlain | .... | B32B 17/10174 |
| 2018/0281352 A1* | 10/2018 | Aoki | ................ | B32B 17/10431 |
| 2018/0281570 A1* | 10/2018 | Labrot | .............. | B32B 17/10339 |
| 2018/0284430 A1* | 10/2018 | Chen | ................ | B32B 17/10761 |
| 2018/0304589 A1* | 10/2018 | Masaki | ............ | B32B 17/10229 |
| 2019/0091972 A1* | 3/2019 | Dassonville | ........... | C03C 17/002 |
| 2019/0329529 A1* | 10/2019 | Schulz | .............. | B32B 17/10568 |

FOREIGN PATENT DOCUMENTS

| | | | | |
|---|---|---|---|---|
| WO | WO-2013190959 A1 * | 12/2013 | ........... | G02B 27/283 |
| WO | WO-2016133187 A1 * | 8/2016 | ................ | B60J 1/02 |
| WO | WO-2019242915 A1 * | 12/2019 | ....... | B32B 17/10458 |

* cited by examiner

| | film thickness | distance e | distortion of HUD image | reflected double image | wedge angle at point of distance e mm from film edge |
|---|---|---|---|---|---|
| example 1 | 100 μm | 5 mm | good | fair | 1.94 mrad |
| example 2 | 100 μm | 10 mm | good | fair | 1.82 mrad |
| example 3 | 100 μm | 15 mm | good | fair | 1.69 mrad |
| example 4 | 100 μm | 20 mm | good | fair | 1.30 mrad |
| example 5 | 100 μm | 25 mm | good | good | 0.80 mrad |
| example 6 | 75 μm | 5 mm | good | fair | 1.44 mrad |
| example 7 | 75 μm | 10 mm | good | fair | 1.37 mrad |
| example 8 | 75 μm | 15 mm | good | fair | 1.29 mrad |
| example 9 | 75 μm | 20 mm | good | good | 1.02 mrad |
| example 10 | 50 μm | 5 mm | good | good | 0.81 mrad |
| example 11 | 50 μm | 10 mm | good | good | 0.80 mrad |
| example 12 | 50 μm | 15 mm | good | good | 0.79 mrad |
| example 13 | 50 μm | 20 mm | good | good | 0.71 mrad |
| comp. ex. 1 | 100 μm | 3 mm | poor | poor | 2.01 mrad |

FIG.8

| | film thickness | amount of overlap d | distortion of HUD image | reflected double image | wedge angle of end part of colored ceramic layer |
|---|---|---|---|---|---|
| example 14 | 100 μm | 15 mm | good | fair | 1.45 mrad |
| example 15 | 100 μm | 30 mm | good | good | 0.71 mrad |
| example 16 | 100 μm | 50 mm | good | good | 0.23 mrad |
| example 17 | 100 μm | 100 mm | good | good | 0.12 mrad |
| example 18 | 75 μm | 15 mm | good | fair | 1.21 mrad |
| example 19 | 75 μm | 30 mm | good | good | 0.59 mrad |
| example 20 | 75 μm | 50 mm | good | good | 0.19 mrad |
| example 21 | 75 μm | 100 mm | good | good | 0.10 mrad |
| example 22 | 50 μm | 15 mm | good | good | 0.79 mrad |
| example 23 | 50 μm | 30 mm | good | good | 0.39 mrad |
| example 24 | 50 μm | 50 mm | good | good | 0.13 mrad |
| example 25 | 50 μm | 100 mm | good | good | 0.07 mrad |
| comp. ex. 2 | 100 μm | 10 mm | poor | poor | 2.15 mrad |

LAMINATED GLASS

CROSS-REFERENCE TO RELATED APPLICATION

The present application is based on and claims priority under 35 U.S.C. § 119 of Japanese applications No. 2018-071768 filed Apr. 3, 2018, and No. 2019-026359 filed Feb. 18, 2019. The contents of the applications are incorporated herein by reference in their entirety.

BACKGROUND OF THE INVENTION

1. Field of the Invention

The disclosure herein generally relates to a laminated glass.

2. Description of the Related Art

In recent years, head-up displays (in the following, also referred to as an "HUD") have become more and more popular. In a head-up display, an image is reflected on a front windshield of a vehicle so that predetermined information is displayed in a driver's view. One of problems for the HUD is an enhancement of visibility. In order to solve the problem, films have been laminated into laminated glasses so that projected images from inside the vehicles are reflected at regions where the films are arranged and information is displayed.

A variety of types of films may be laminated in the laminated glass. For example, a film reflecting a P polarized light may be used. When the film reflecting P polarized light is laminated in the laminated glass, and for a light source of the HUD a P polarized light source is used, a polarization state of an image becomes a P-polarized state. Thus, the visibility for the HUD image can be enhanced when polarized sunglasses are employed (See, for example, Japanese Translation of PCT International Application Publication No. JP-T-2006-512622).

SUMMARY OF THE INVENTION

Technical Problem

However, near the edge of the film, the shape and the thickness of the front windshield vary. Thus, when a HUD image is projected near the edge of the film, the view of the HUD image may be distorted.

The present invention was made in view of the aforementioned problem, and mainly aims to reduce the distortion of a HUD image on a laminated glass, in which a film is arranged in a display area for reflecting a projected image from vehicle interior to display information.

Solution to Problem

According to an aspect of the present invention, a laminated glass having a vehicle exterior side glass plate; a vehicle interior side glass plate; and an intermediate film disposed between the vehicle exterior side glass plate and the vehicle interior side glass plate, the laminated glass including a display area for reflecting a projected image from vehicle interior, to display information, in at least a part of the display area, the intermediate film being arranged between the vehicle exterior side glass plate and the vehicle interior side glass plate, the intermediate film being a main reflection surface for the projected image, and the display area being located in a region inside by 5 mm from an edge of the film.

Effect of Invention

According to the description of the embodiment, the distortion of an HUD image can be reduced in a laminated glass in which a film is arranged in a display area for reflecting a projected image from vehicle interior to display information.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, with reference to drawings, embodiments for implementing the present invention will be described. In each drawing, the same or corresponding reference numeral is assigned to the same or corresponding component, and redundant explanation will be omitted. Note that in the following, a front windshield for vehicle will be described as an example, but the present invention is not limited to this. A laminated glass according to the embodiment can be also applied to a glass other than the front windshield for a vehicle, such as a side glass, a rear glass or a roof glass. Moreover, in the drawings, in order to facilitate understanding of the content of the present invention, a dimension or a shape is partially exaggerated.

Figure 1A:
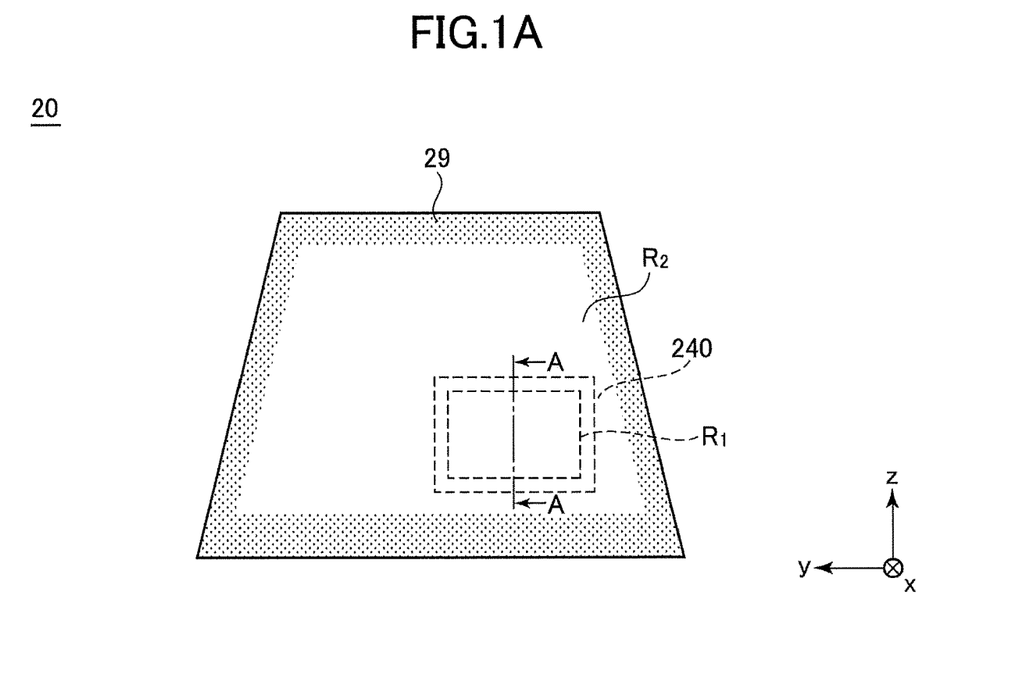
FIGS. 1A and 1B are diagrams depicting an example of a front windshield for vehicle according to an embodiment.
Figure 1B:
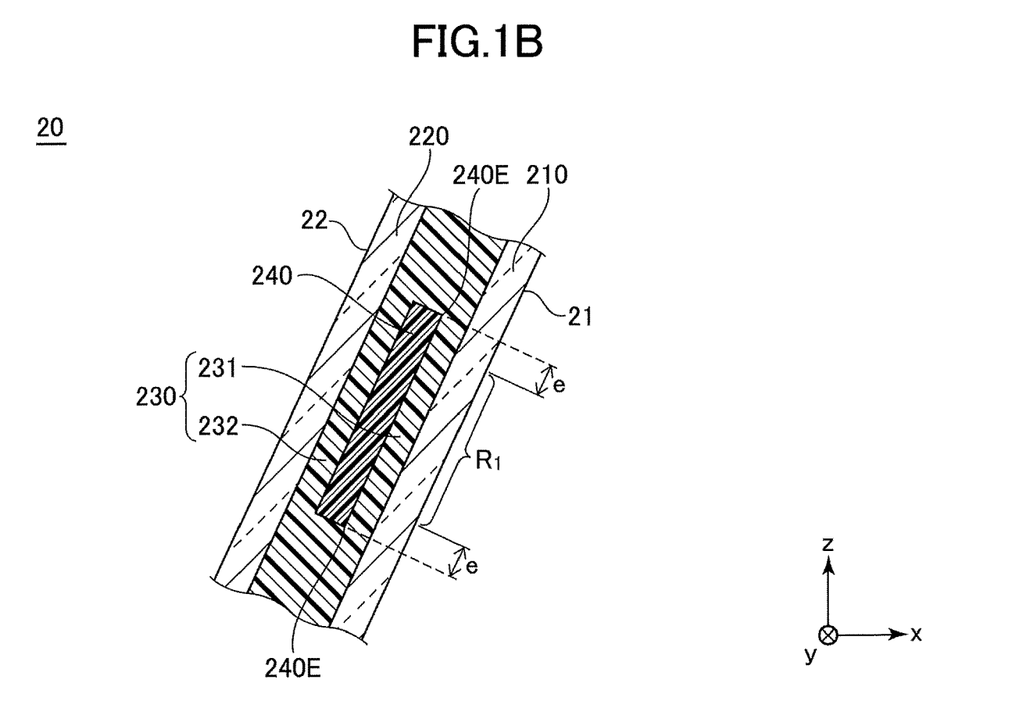

FIGS. 1A and 1B are diagrams depicting an example of the front windshield for vehicle according to an embodiment. FIG. 1A is a diagram schematically depicting an example of the front windshield viewed from the vehicle interior to the vehicle outside (The front windshield 20 is mounted to the vehicle where the z-axis direction is upward). FIG. 1B is a partial cross section along an A-A line in FIG. 1A.

As illustrated in FIG. 1A, the front windshield 20 is provided with a HUD display area $R_1$ used for the HUD, and a region outside the HUD display area $R_2$ (transparent region) that is not used for the HUD. The HUD display area $R_1$ is a display area for reflecting a projected image from the vehicle interior and displaying information. The HUD display area $R_1$ is set to be a region of the front windshield 20 which is irradiated with light from a mirror configuring the HUD arranged inside the vehicle, when the mirror configuring the HUD is rotated and viewed from a V1 point (not shown) of JIS standard R3212. Moreover, in the specification, the transparent region indicates a region of a test region C (not shown) defined in the JIS standard R3212. In the specification of the present application, the display area refers to a region that reflects a projected image and displays information. Moreover, in the specification of the present application, the HUD includes both a type of visually recognizing a virtual image and a type of visually recognizing a real image.

In a peripheral portion of the front windshield 20, a colored ceramic layer 29 is arranged. The colored ceramic layer 29 can be formed by applying a printing ink of a predetermined color on glass surface, and baking the ink. Because the opaque colored ceramic layer 29 is arranged on the peripheral portion of the front windshield 20, a resin such as a urethane that holds the peripheral portion of the front windshield 20 to the vehicle body can be prevented from being degraded due to an ultraviolet light. Note that the colored ceramic layer 29 is, for example, black. However, the present invention is not limited to this.

The HUD display area $R_1$ located, for example, at a position at the height of eye point of a driver in a lower part of the front windshield 20, and the region outside the HUD display area $R_2$ is located around the HUD display area $R_1$ of the front windshield 20. In FIG. 1A, in a lower part of the front windshield 20, a film 240 is arranged. The film 240 does not have a part that overlaps with the colored ceramic layer 29 in a planar view. The film 240 is a main reflection surface for the projected image from vehicle interior.

As illustrated in FIG. 1B, the front windshield 20 is a laminated glass for vehicle provided with a glass plate 210 that is a vehicle interior side glass plate, a glass plate 220 that is a vehicle exterior side glass plate, an intermediate film 230, and a film 240. In the front windshield 20, the glass plate 210 and the glass plate 220 are fixed in a state where the intermediate film 230 is held in between.

The intermediate film 230 may be formed of a plurality of layers of intermediate films. In FIG. 1B, the intermediate film 230 is formed of two layers of intermediate films 231 and 232. However, the intermediate film 230 may be formed of three or more layers.

In the HUD display area $R_1$ in the front windshield 20, the film 240 is arranged between the intermediate film 231 and the intermediate film 232. A vehicle interior side surface of the film 240 adheres to a vehicle exterior side surface of the glass plate 210 via the intermediate film 231. A vehicle exterior side surface of the film 240 adheres to a vehicle interior side surface of the glass plate 220 via the intermediate film 232. Note that the intermediate films 231 and 232 function as adhesion layers, but one of the intermediate layers 231 and 232 may be replaced by a thin adhesion layer.

Note that in a region where the film 240 is not arranged, the intermediate films 231 and 232 are integrated and fill between the glass plate 210 and the glass plate 220.

The film 240 is not particularly limited as long as the film 240 has a predetermined function, such as enhancing visibility of reflected images under predetermined conditions. For example, the film 240 may include a P polarized light reflection film, a hologram film, a transparent screen of a scattering reflection system, a transparent screen of a scattering transmission system, a light control film of a scattering reflection system, a light control film of a scattering transmission system, a high reflectivity film dedicated to HUD, and the like.

The light control film includes a suspended particle device (SPD), a polymer dispersion type liquid crystal (PDLC) device, a guest-host type liquid crystal device, a photochromic device, and a electrochromic device. In the case of the optical system, in which a projected image is reflected at a film surface and a virtual image is visually recognized, such as a P polarized light reflection film, because a distortion of the image easily arises from a waviness of the film, the film 240 particularly receives the effect of the present invention.

A thickness of the film 240 is preferably, for example, 25 μm or more and 200 μm or less, and further preferably 25 μm or more and 110 μm or less. The film 240 is transparent to visible light, and when the laminated glass is a front windshield or a side glass, the film 240 has a visible light transmittance defined in JIS R3106:1998.

Note that when the film 240 is a P polarized light reflection film, in a state where the film 240 is laminated in the front windshield 20, a reflectance of P polarized light at an incident angle that is a Brewster angle is preferably 5% or more, more preferably 7% or more, and further preferably 9% or more. When the reflectance of P polarized light falls within the aforementioned range, a HUD image can be visually recognized.

The HUD display area $R_1$ is arranged in a region inside by e=5 mm from an edge 240E of the film 240. Near the edge 240E of the film 240 the shape and thickness of the front windshield 20 vary near the edge 240E of the film 240. However, in FIG. 1B, the variation of the thickness of the laminated glass near the edge 240E of the film 240 is not shown. Thus, when a HUD image is projected onto the front windshield 20 near the edge 240E of the film 240, the visually recognized HUD Image may be distorted, and furthermore a reflected double image may be visually recognized.

As a result of a diligent study, the inventors of the present application have found that by arranging the HUD display area $R_1$ in the region inside by 5 mm from the edge 240E of the film 240, the region, in which the shape and thickness of the front windshield 20 near the edge 240E of the film 240 vary, can be avoided, and the distortion of the HUD image and a reflected double image can be reduced. Note that "arranging in the region inside by 5 mm from the edge 240E" means that the display area may be arranged at any region as long as the region is inside by 5 mm from the edge 240E.

Particularly, in a configuration where the laminated glass has a curvature radius and an image enlarged by a concave mirror or the like is further enlarged by a laminated glass having a curved surface and reflected, the variation in the shape and thickness of the font windshield 20 near the edge 240E of the film 240 generates a great distortion in a HUD image. Thus, it is quite important to avoid the projection of the HUD image near the edge 240E of the film 240. By arranging the HUD display area $R_1$ in the region inside by 5 mm from the edge 240E of the film 240, when the image enlarged by the concave mirror or the like is further enlarged by the laminated glass having a curved surface and reflected, the distortion in the HUD image can be reduced.

Moreover, the HUD display area $R_1$ is preferably arranged in a region inside by e=10 mm from the edge 240E of the film 240, and further preferably arrange in a region inside by e=15 mm from the edge 240E of the film 240. When the HUD display area $R_1$ is located in the aforementioned region, the HUD display area $R_1$ is further separated from the region, in which the shape and thickness of the front windshield 20 near the edge 240E of the film 240 vary. Thus, the distortion of the HUD image and the reflected double image can be further reduced.

Note that, the HUD display area is not limited to one site. For example, the HUD display area may be divided and arranged at a plurality of sites along the Z direction, and may be divided and arrange at a plurality of sited along the Y direction. In the case where the HUD display area is divided and arranged at a plurality of sites, it is enough to provide the film 240 on at least a part of the HUD display area. Also in this case, a HUD display area, in the part where the film 240 is arranged, is arranged in a region inside by e=5 mm from an edge 240E of the film 240, more preferably arranged in a region inside by e=10 mm from the edge 240E of the film 240, further preferably arranged in a region inside by e=15 mm from the edge 240E of the film 240, further preferably arranged in a region inside by e=20 mm from the edge 240E of the film 240, and further preferably arranged in a region inside by e=25 mm from the edge 240E of the film 240.

The distance e [mm] between the HUD display area $R_1$ and the edge 240E of the film 240, and a thickness t [mm] of the film 240 preferably satisfy a following equation (1). When the distance e and the thickness t satisfy the equation (1), the distortion of the HUD image and the reflected double image can be certainly reduced.

Figure 2:
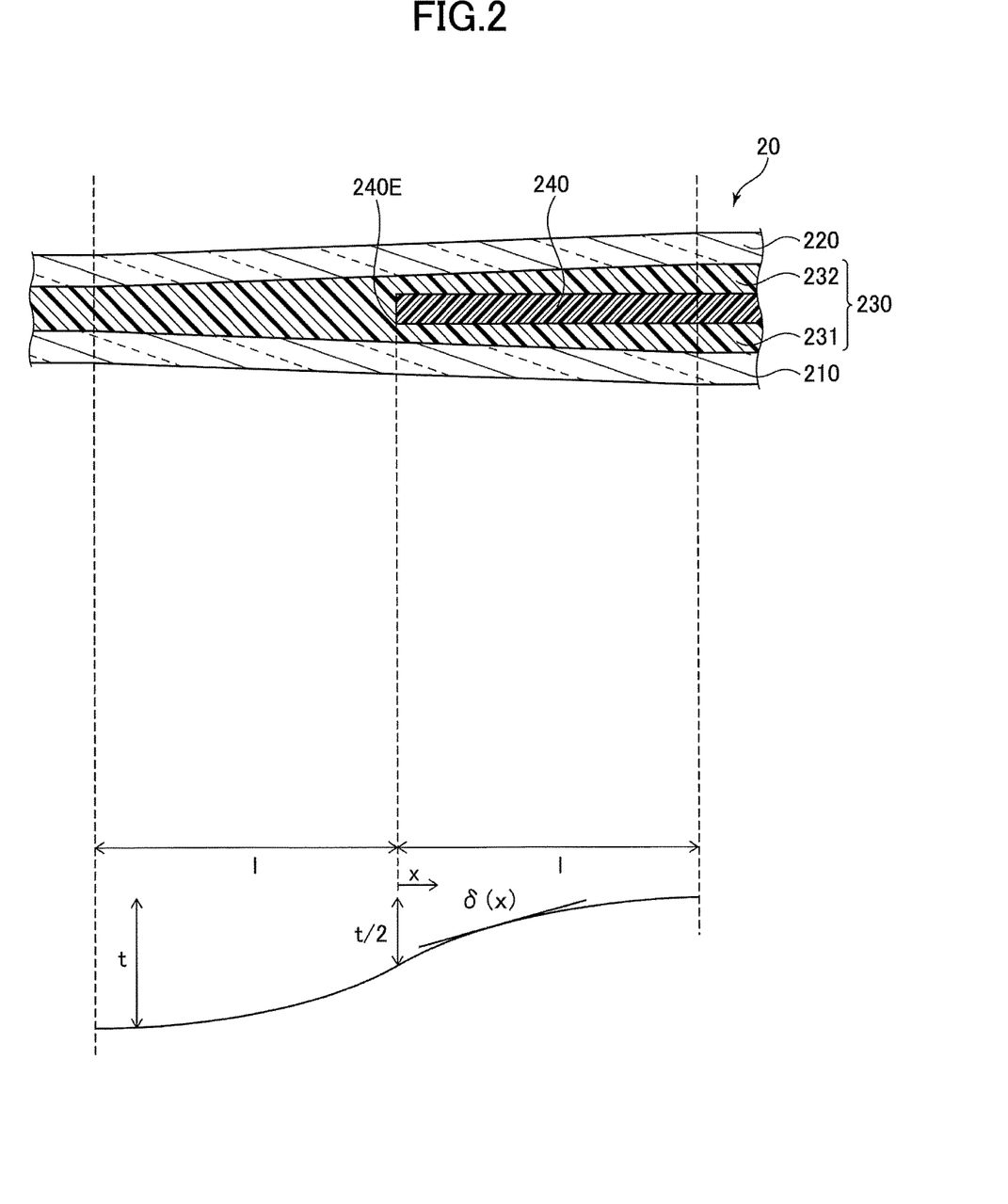
FIG. 2 is a diagram for explaining a derivation of equation (1)

[Math 1]

$$40 > e \geq 5 \text{ and } t \leq \frac{4l^3}{3} \frac{\delta}{l^2 - e^2} \quad (1)$$

where l is a distance from the edge 240E of the film 240 to a part where the variation in thickness of the laminated glass does not occur. In the following, the distance l is set to 40 mm. Moreover, δ is a wedge angle of the front windshield 20 at a part which is separated from the edge 240E of the film 240 by the distance e [mm] (the wedge angle will be described later with reference to FIG. 2). In the following, the wedge angle δ is set to 0.0012 [rad]. When the wedge angle δ is 0.0012 [rad] or less, the reflected double image is less conspicuous. Note that when the distance e is 40 mm or more, the thickness t may be any value.

Equation (1) can be derived as follows. FIG. 2 is a diagram for explaining the derivation of equation (1). An upper part of FIG. 2 is a cross-sectional diagram depicting an example of the laminated glass near the edge 240E of the film 240. A lower part of FIG. 2 is a graph depicting an example of a thickness of the laminated glass. Moreover, a range of the vertical axis of the upper part of FIG. 2 is different from that of the lower part of FIG. 2.

As illustrated in FIG. 2, the thickness of the laminated glass (front windshield 20) varies in the edge 240E of the film 240. In the upper part of FIG. 2, for convenience sake, the thickness of the laminated glass is illustrated so as to vary monotonically. However, the thickness of the laminated glass is exaggerated in the drawings, and actually varies as illustrated in the lower part of FIG. 2. A degree of variation of the thickness of the laminated glass near the edge 240E of the film 240 will be expressed by a wedge angle δ(x), as illustrated in the lower part of FIG. 2.

In FIG. 2, in a theoretical relation for a force applied to a beam and a displacement, from a relation with a force that generates a displacement in thickness of the film 240, $$P/EI = 3t/2l^3 \quad (A)$$

is obtained. In equation (A), P is a force that generates a displacement in thickness of the film 240, EI is a bending rigidity of the laminated glass, t is a thickness of the film 240, and l is a distance from the edge 240E of the film 240 to a part where the variation in thickness of the laminated glass does not occur.

By substituting equation (A) in a theoretical relation for a force applied to a beam and an inclination $$\delta(x) = -P(l^2 - x^2)/2EI$$

and rearranging, equation (1) can be obtained. In the above relation, x is a distance from the edge 240E of the film 240.

Figure 3:
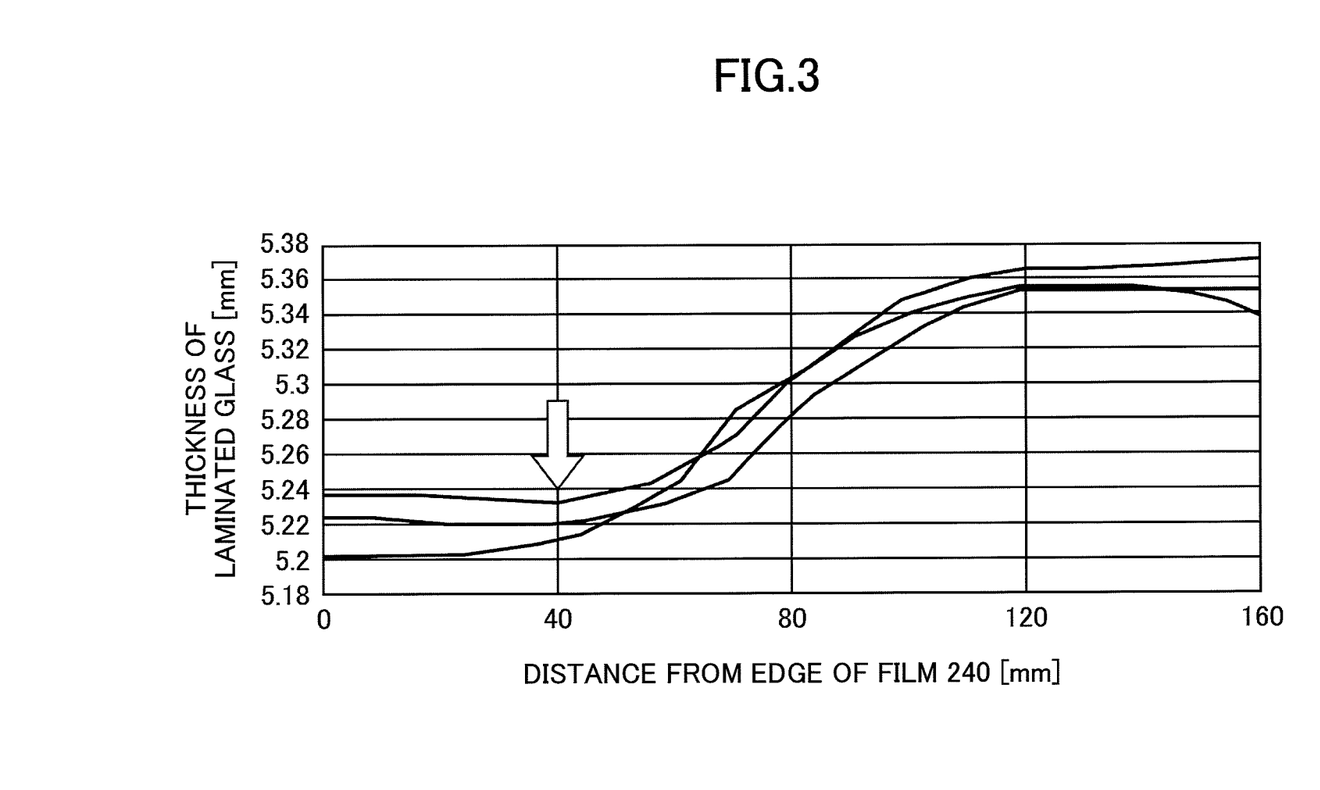
FIG. 3 is another diagram for explaining the derivation of equation (1)

Note that the distance l, from the edge 240E of the film 240 to a part where the variation in thickness of the laminated glass does not occur, is set to 40 mm, based on actual measurement values obtained as a result of accumulation of studies by the inventors. For example, in the upper part of FIG. 2, when plate thicknesses of the glass plates 210 and 220 are 2.0 mm, a film thickness of the intermediate film 231 is 0.38 mm, a film thickness of the intermediate film 232 is 0.83 mm, and a film thickness of the film 240 is 0.1 mm, an actual measurement value (N=3) in FIG. 3 is obtained. From FIG. 3, the inventors found that the variation in thickness of the laminated glass does not occur at a part (indicated by an arrow) where a distance from the edge 240E of the film 240 is 40 mm.

Moreover, in the case where the film 240 is a light control film, the film has electrodes for driving, and the thickness of the glass varies due to the thickness of the electrodes. Thus, when the HUD display area is located near the electrodes, a display image may be distorted. The HUD display area is preferably separated from the electrodes by 5 mm or more, in addition to the distance from the edge 240E, and more preferably separated from the electrode by 10 mm or more.

Figure 4A:
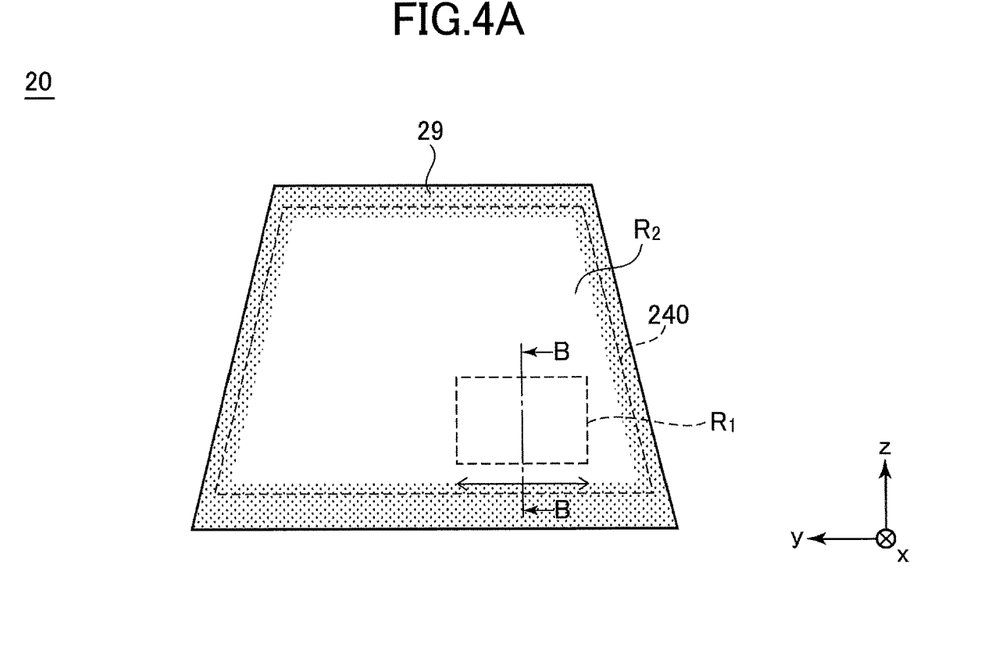
FIGS. 4A and 4B are diagrams depicting another example of the front windshield for vehicle according to the embodiment.
Figure 4B:
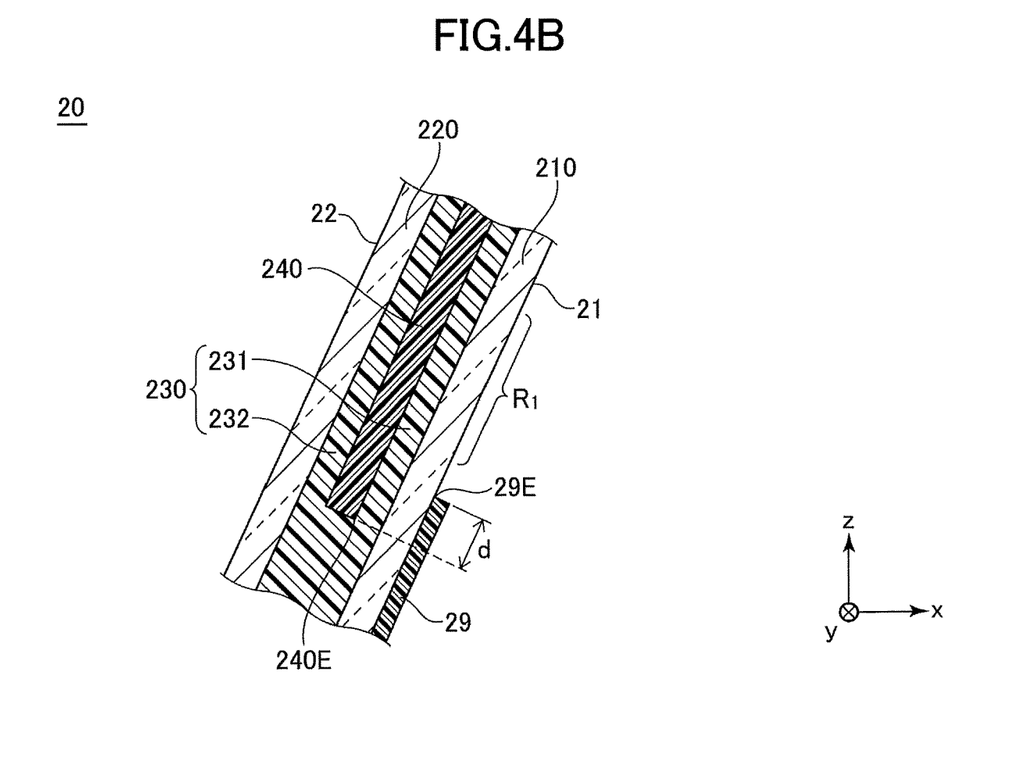

FIGS. 4A and 4B are diagrams depicting another example of the front windshield for vehicle according to the embodiment. FIG. 4A is a diagram schematically depicting an example of the front windshield viewed from the vehicle interior to the vehicle outside (the front windshield 20 is mounted to the vehicle where the z-axis direction is upward). FIG. 4B is a partial cross section along a B-B line in FIG. 4A. Note that in FIG. 4B, the variations in thickness of the laminated glass near the edge 240E of the film 240 and near an edge 29E of the colored ceramic layer 29 are not illustrated.

The film 240 may be arranged, for example, as illustrated in FIGS. 4A and 4B, so that the film 240 includes the entire HUD display area $R_1$ and the entire region outside the HUD display area $R_2$, and an outer peripheral portion of the film 240 overlaps with an inner periphery portion of the colored ceramic layer 29, in a planar view.

Note that in FIG. 4B, the colored ceramic layer 29 is arranged on the vehicle interior side surface of the glass plate 210 (inner surface 21 of the front windshield 20). However, the present invention is not limited to this. The colored ceramic layer 29 may be arranged, for example, on the vehicle interior side surface of the glass plate 220, or may be arranged both on the vehicle interior side surface of the glass plate 210 and the vehicle interior side surface of the glass plate 220. In this case, an edge of a colored ceramic layer arranged on a more inner surface side (central side of the laminated glass) is set to the edge 29E. Moreover, in order to make the edge 240E of the film 240 invisible from the vehicle exterior side, the colored ceramic layer 29 is preferably arranged on the vehicle interior side surface of the glass plate 220.

In FIGS. 4A and 4B, the film 240 and the colored ceramic layer 29 have regions overlapping with each other. The amount of overlap d of the film 240 and the colored ceramic layer 29 may be 15 mm or more. Necessarily, the HUD display area $R_1$ is arranged in a region inside by 15 mm from the edge 240E of the film 240.

Note that in the specification of the present application, the amount of overlap d will be defined as an amount where the film 240 and the colored ceramic layer 29 overlap with each other, in a direction from an inner peripheral portion to an outer peripheral portion of the colored ceramic layer 29 in a planar view of the laminated glass.

Near the edge 29E of the colored ceramic layer 29, when the glass is shaped, the shape and thickness of the front windshield 20 vary due to a difference in heat absorptivity between the glass and the colored ceramic layer. Thus, in the case where a distance between the edge 29E of the colored ceramic layer 29 and the edge 240E of the film 240 decreases, the aforementioned influence by the thickness of the film 240 and the influence by the colored ceramic layer 29 are combined, and when a HUD image is projected onto the region, a distortion of the HUD image that is visually recognized and the reflected double image are further emphasized. By making the amount of overlap d between the film 240 and the colored ceramic layer 29, 15 mm or more, the distortion of the HUD image and the reflected double image can be reduced.

However, in the case of FIGS. 4A and 4B, over the entire circumference of the region where the colored ceramic layer 29 and the film 240 overlap with each other, the amount of overlap d is not necessary to be 15 mm or more. At least near the HUD display area $R_1$, the amount of overlap d is preferably 15 mm or more. For example, in FIGS. 4A and 4B, a part immediately below the HUD display area $R_1$ (in FIGS. 4A and 4B, indicated by a bidirectional arrow) is near the HUD display area $R_1$. At least in this part, the amount of overlap d is preferably 15 mm or more. Note that "near the HUD display area $R_1$" indicates a part, a distance of which from the HUD display area $R_1$ and from the colored ceramic layer 29 is 150 mm or less.

Particularly, assume that the laminated glass has a curvature radius so that the image enlarged by a concave mirror or the like is further enlarged upon reflection in a laminated glass having a curved surface, and the edge 29E of the colored ceramic layer 29 and the edge 240E of the film 240 approach each other. When a HUD image is projected onto a display area, a distortion of the HUD image to be visually recognized and the reflected double image are emphasized. Thus, for the image enlarged by the concave mirror or the like being further enlarged by the laminated glass with curved surface and reflected, the distortion of the HUD image can be reduced when the amount of overlap d between the film 240 and the colored ceramic layer 29 is 15 mm or more.

Moreover, the amount of overlap d between the film 240 and the colored ceramic layer 29 is more preferably 20 mm or more, further preferably 30 mm or more, further preferably 50 mm or more, further preferably 100 mm or more, and further preferably 200 mm or more. When the amount of overlap falls within the aforementioned range, the edge 29E of the colored ceramic layer 29 can be separated more from the edge 240E of the film 240, and the distortion of the HUD image and the reflected double image can be further reduced.

The amount of overlap d [mm] between the film 240 and the colored ceramic layer 29 and the thickness t [mm] of the film 240 preferably satisfy the following equation (2). When the amount of overlap d and the thickness t satisfy the equation (2), the distortion of the HUD image and the reflected double image can be certainly reduced.

[Math 2]

$$40 > d \geq 15 \text{ and } t \leq \frac{4l^3}{3} \frac{\delta}{l^2 - d^2} \qquad (2)$$

where l is a distance from the edge 240E of the film 240 to a part where the variation in thickness of the laminated glass does not occur. In the following, the distance l is set to 40 mm. Moreover, δ is a wedge angle of the front windshield 20 at the edge 29E of the colored ceramic layer 29. In the following, the wedge angle δ is set to 0.0010 [rad]. The reason why the wedge angle δ is set to 0.0010 [rad], different from equation (1), is that the wedge angle increases by the colored ceramic layer 29, and thus the wedge angle by the film 240 is required to be suppressed in order to reduce the distortion of the HUD. Equation (2) can be derived in the same way as equation (1). Note that when the distance e is 40 mm or more, the thickness t may be any value.

Figure 5:
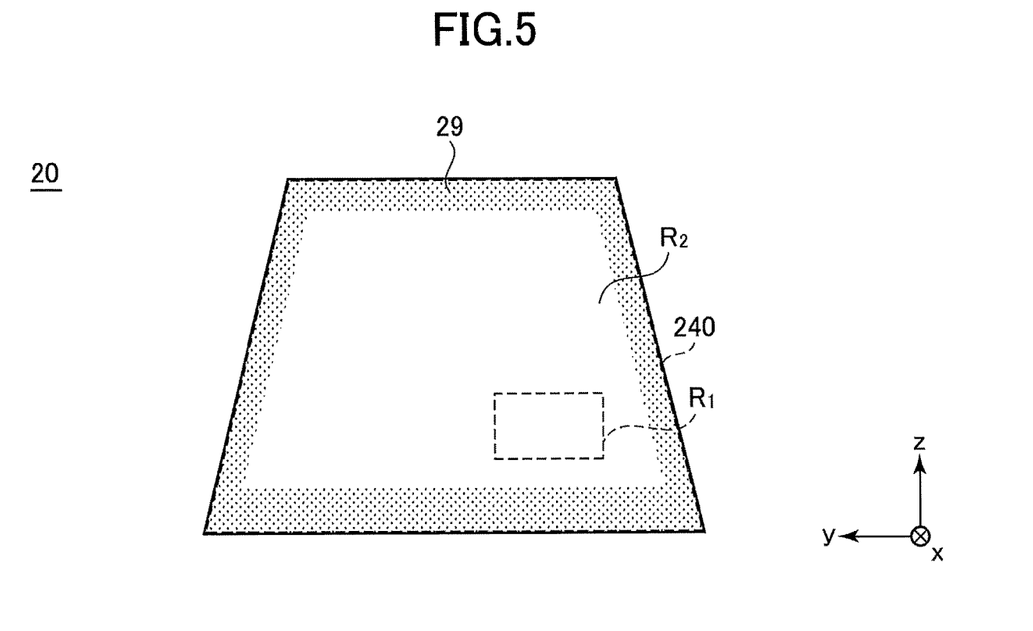
FIG. 5 is a diagram depicting yet another example of the front windshield for vehicle according to the embodiment.

Moreover, the film 240 may be arranged, for example, as illustrated in FIG. 5, so that the film 240 includes the entire HUD display area $R_1$ and the entire region outside the HUD display area $R_2$, and an outer peripheral portion of the film 240 overlaps with substantially the entire colored ceramic layer 29, in a planar view. Moreover, the outer periphery portion of the film 240 may be separated from an end part of an outer periphery portion of the laminated glass by a distance. The edge of the film 240 may be separated from the end part of the outer periphery portion of the laminated glass by 5 mm or more, may be separated by 10 mm or more, and may be separated by 15 mm or more. Moreover, the film 240 may be arranged so that any of an upper side portion, a lateral side portion, and a lower side portion overlaps with an inner periphery portion of the colored ceramic layer 29. A peripheral edge of the inner periphery portion of the colored ceramic layer 29 preferably has a dot pattern because the distortion of the HUD image can be reduced.

Figure 6A:
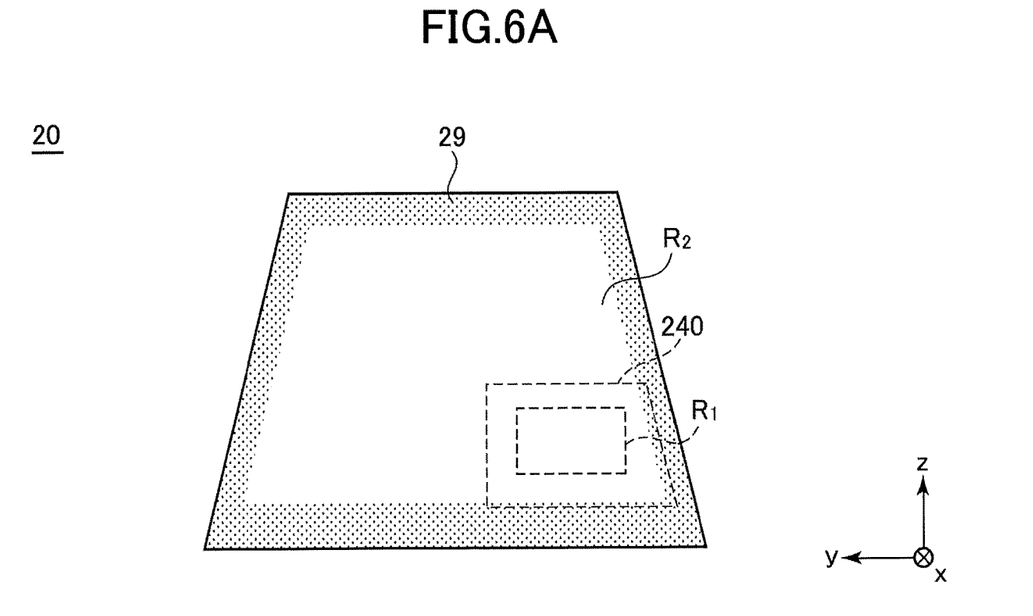
FIGS. 6A to 6C are diagrams depicting still another example of the front windshield for vehicle according to the embodiment.
Figure 6B:
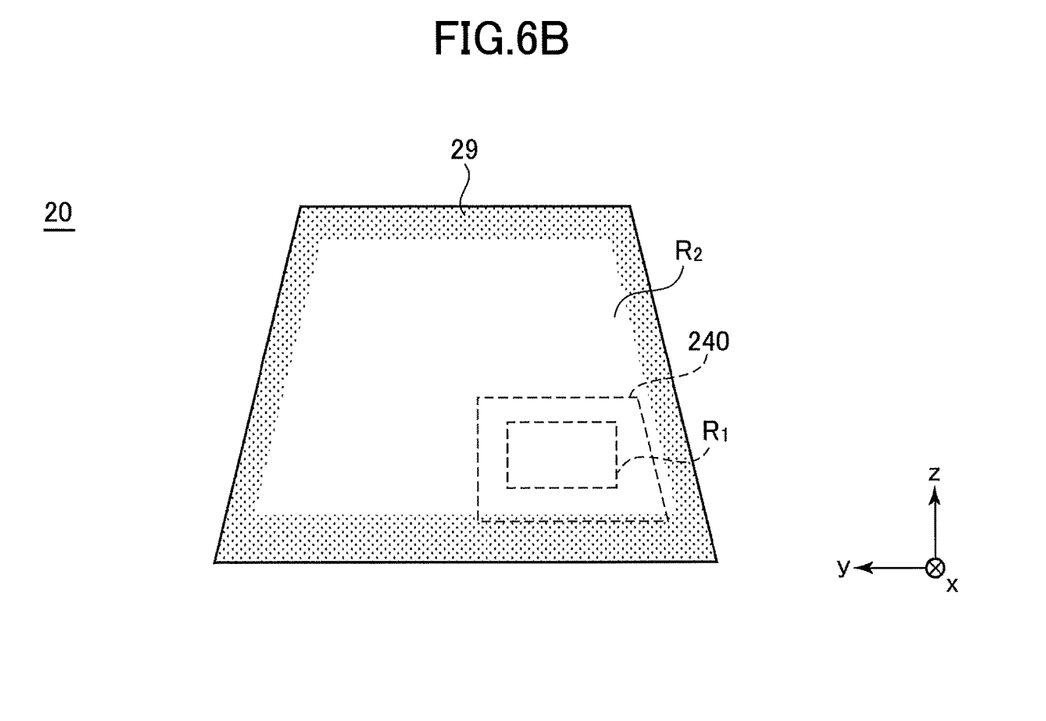
Figure 6C:
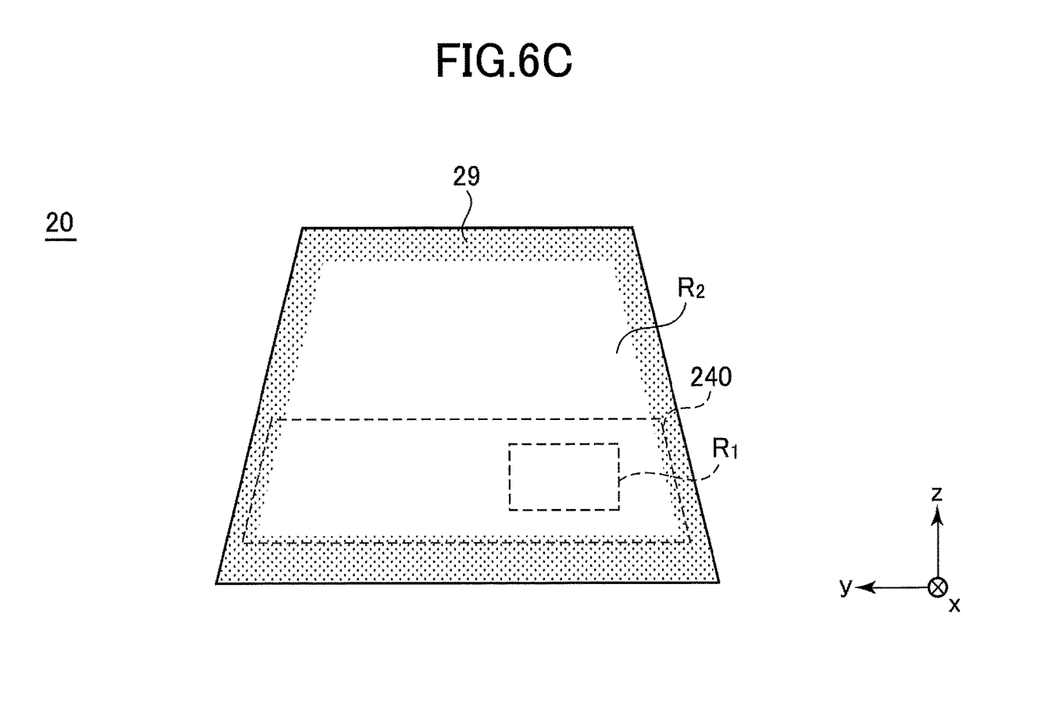

For example, as illustrated in FIG. 6A, the film 240 may be arranged so that the film 240 includes the HUD display area $R_1$ and a region around the HUD display area $R_1$, and the lower side portion and the one of the lateral side portions overlap with the inner periphery portion of the colored ceramic layer 29. Moreover, the film 240 may be arranged, for example, as illustrated in FIG. 6B, so that the film 240 includes the HUD display area $R_1$ and a region around the HUD display area $R_1$, and the lower side portion overlaps with the inner periphery portion of the colored ceramic layer 29. Moreover, the film 240 may be arranged, for example, as illustrated in FIG. 6C, so that the film 240 includes the HUD display area $R_1$ and a region around the HUD display area $R_1$, and the lower side portion and both the lateral side portions overlap with the inner periphery portion of the colored ceramic layer 29. In any case, the amount of overlap d between the film 240 and the colored ceramic layer 29 is 15 mm or more, and necessarily, the HUD display area $R_1$ is arranged in a region inside by 15 mm from the edge 240E of the film 240.

At the height of the eye point of the driver, because the HUD display area $R_1$ is often arranged near the lower side of the front windshield 20, it is most preferable to cause the amount of overlap between the lower side portion of the film 240 and the colored ceramic layer 29 to fall within the predetermined range of the present application. Moreover, because the front windshield 20 is mounted vertically inclined to the vehicle, it is preferable to cause the amount of overlap between the lower side portion and upper side portion of the film 240 and the colored ceramic layer 29 to fall within the predetermined range of the present application.

As a description common to FIGS. 1A to 6C, an inner surface 21 of the front windshield 20 that is one surface of the glass plate 210 arranged inside the vehicle and an outer surface 22 of the front windshield 20 that is one surface of the glass plate 220 arranged outside the vehicle may be planar surfaces or curved surfaces. Note that the one surface (inner surface 21) of the glass plate 210 and another surface that is an opposite surface thereof are smooth. Moreover, the one surface (outer surface 22) of the glass plate 220 and another surface that is an opposite surface thereof are smooth.

In the HUD display area, the front windshield 20 preferably has a curvature. A curvature radius in the vertical direction of the front windshield 20 is preferably 4000 mm or more and 20000 mm or less, and more preferably 6000 mm or more and 20000 mm or less. Moreover, in the HUD display area, a curvature radius in the horizontal direction of the front windshield 20 is preferably 1000 mm or more and 10000 mm or less. When the curvature radii in the vertical and horizontal directions fall within the aforementioned ranges, respectively, the distortion of the HUD image projected onto the film 240 can be reduced. Particularly, when the aforementioned radius is small, the film becomes wrinkled.

For the glass plates 210 and 220, for example, a soda lime glass, an aluminosilicate glass, an organic glass or the like can be used. The glass plates 210 and 220 can be manufactured, for example, by using the floating method.

A plate thickness of the thinnest portion of the glass plate 220, which is arranged on the vehicle exterior side of the front windshield 20, is preferably 1.8 mm or more and 3 mm or less. When the plate thickness of the glass plate 220 is 1.8 mm or more, strengths such as a flying stone resistance are sufficient. When the plate thickness is 3 mm or less, the laminated glass is not excessively heavy, and it is preferable from a viewpoint of a fuel efficiency of the vehicle. The plate thickness of the thinnest portion of the glass plate 220 is more preferably 1.8 mm or more and 2.8 mm or less, and further preferably 1.8 mm or more and 2.6 mm or less.

A plate thickness of the glass plate 210 which is arranged on the vehicle interior side of the front windshield 20 is preferably 0.3 mm or more and 2.3 mm or less. When the plate thickness of the glass plate 210 is 0.3 mm or more, it becomes easy to handle the glass plate. When the plate thickness is 2.3 mm or less, the laminated glass is not excessively heavy.

When the plate thickness of the glass plate 210 is 0.3 mm or more and 2.3 mm or less, characteristics of the glass (e.g. residual stress) can be maintained. Making the plate thickness of the glass plate 210 0.3 mm or more and 2.3 mm or less is particularly effective for maintaining a glass quality (e.g. residual stress) of a deeply bending glass. The thickness of the glass plate 210 is more preferably 0.5 mm or more and 2.1 mm or less, and further preferably 0.7 mm or more and 1.9 mm or less.

However, the plate thicknesses of the glass plates 210 and 220 are not always constant, and may vary at each portion as necessary. For example, one of or both the glass plates 210 and 220 may be provided with a region having a cross section that has a wedge shape, in which the thickness of an upper edge in the vertical direction is greater than the thickness of a lower edge, when the front windshield 20 is installed in the vehicle.

In the case where the front windshield 20 is curved, the glass plates 210 and 220 are bend-formed, after being by the float process or the like, and before bonding via the intermediate film 230. The bending is performed by softening the glass by heating. A heating temperature for glass on the bending falls within a range of about 550° C. to 700° C.

For the intermediate film 230 for bonding the glass plate 210 and the glass plate 220 (intermediate films 231 and 232), a thermoplastic resin is often used. Thermoplastic resins that have been used conventionally for this kind of purpose includes, for example, a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin. Moreover, a resin composition including a modified block copolymer hydride disclosed in Japanese Patent No. 6065221 can be preferably used.

Among the aforementioned resins, a plasticized polyvinyl acetal resin is preferably used, because of its excellent balance of properties, such as transparency, weather resistance, strength, bond strength, resistance to penetration, absorbability for impact energy, humidity resistance, thermal insulating property, and sound insulating property. The thermoplastic resin may be used singly, or two or more types of thermoplastic resins may be used in combination. The term "plasticized" in the plasticized polyvinyl acetal resin means that the resin is made plasticizing by adding a plasticizing agent. The same applies to the other plasticized resins.

The polyvinyl acetal resin may include a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellent balance of properties, such as transparency, weather resistance, strength, bond strength, resistance to penetration, absorbability for impact energy, humidity resistance, thermal insulating property, and sound insulating property. The polyvinyl acetal resin may be used singly, or two or more types of polyvinyl acetal resins may be used in combination. However, a material forming the intermediate film 230 is not limited to a thermoplastic resin.

The total film thickness of the intermediate film 230 is preferably 0.5 mm or more even at the thinnest portion. When the film thickness of the intermediate film 230 is 0.5 mm or more, the resistance to penetration required for a front windshield is sufficient. Moreover, the total film thickness of the intermediate film 230 is preferably 3 mm or less even at the thickest portion. When the maximum value of the film thickness of the intermediate film 230 is 3 mm or less, the laminated glass is not excessively heavy. The maximum value of the film thickness of the intermediate film 230 is more preferably 2.8 mm or less, and further preferably 2.6 mm or less.

Thicknesses of the intermediate films 231 and 232 may be 0.51 mm or less, may be 0.39 mm or less, may be 0.26 mm or less, may be 120 μm or less, may be 100 μm or less, may be 50 μm or less, may be 20 μm or less, may be 10 μm or less, may be 5 μm or less, or may be 2 μm or less. In the case where the intermediate films 231 and 232 are thin, an adhesive layer, described below, may be used as the intermediate film.

Note that in the intermediate film 230, one or more of the intermediate film 231 and 232 has three or more layers. For example, by configuring the intermediate layer 230 with three layers, and making hardness of the central layer less than hardness of both adjacent layers by controlling the plasticizing agent or the like, the sound insulation function of the laminated glass can be enhanced. In this case, hardness of both the adjacent layers may be the same or may be different from each other.

For any one of the intermediate films 231 and 232, a thin adhesive layer may be used. The material of the adhesive layer is not particularly limited as long as the material has a function of fixing the film 240, but may include, for example, an acrylic material, an acrylate material, a urethane material, a urethane-acrylate-based material, an epoxy-based material, an epoxy-acrylate-based material, a polyolefin material, a modified olefinic material, a polypropylene material, an ethylene-vinyl alcohol-based material, a vinyl chloride material, a chloroprene rubber-based material, a cyanoacrylate-based material, a polyamide material, a polyimide based material, a polystyrene material, or a polyvinyl butyral material. The material of the adhesive layer is transparent to visible light. Moreover, the material preferably does not have a bonding property at a room temperature before the step of manufacturing the laminated glass.

In order to prepare the intermediate films 231 and 232, for example, the aforementioned resin material, that comprises each of the intermediate films, is properly selected, and an extrusion molding is performed using an extruder in a heated and molten state. An extrusion condition, such as an extrusion rate of the extruder, is set to be uniform. Afterwards, the extrusion shaped resin film is extended as necessary in order to have curvatures in an upper side and a lower side so as to fit a shape of the front windshield 20, and thereby the intermediate films 231 and 232 are completed.

In order to prepare a laminated glass, a laminated body is formed by holding the intermediate film 231, the film 240 and the intermediate film 232 between the glass plate 210 and the glass plate 220. For example, the laminated body is placed in a rubber bag, and the bonding is performed under a vacuum of −65 to −100 kPa and at a temperature of about 70 to 100° C.

Furthermore, for example, by performing a pressure bonding process of heating and pressurizing under a condition of a temperature of 100 to 150° C., and a pressure of 0.6 to 1.3 MPa, the durability of the laminated glass may be improved. However, in some cases, taking into account simplification of processes, and characteristics of a material enclosed in the laminated glass, the heating and pressurizing process may not need to be used.

Moreover, between the glass plate 210 and the glass plate 220, other than the intermediate film 230 and the film 240, a film or a device having a function of an infrared light reflection, light emission, power generation, dimming, visible light reflection, scattering, decoration, absorption, electric heating or the like may be arranged, as long as the effect of the present application is not affected. Moreover, on the surface of the laminated glass, a film having a function of an anti-fogging, a water repellency, a heat insulation, a low reflection or the like may be formed.

Note that a field of view (FOV) of the HUD is, for example, 4 deg×1 deg or more. The FOV of the HUD may be set to be 5 deg×1.5 deg or more, 6 deg×2 deg or more, or 7 deg×3 deg or more. As the FOV of the HUD increases, an influence of a waviness of the film 240 easily appears. Thus, for the film 240, the present invention is particularly effective.

In this way, by arranging the HUD display area $R_1$ in the region inside by 5 mm from the edge 240E of the film 240, the region, in which the shape and thickness of the front windshield 20 near the edge 240E of the film 240 vary, can be avoided, and the distortion of the HUD image and a reflected double image can be reduced.

Moreover, by setting the amount of overlap between the film 240 and the colored ceramic layer 29 to be 15 mm or more, the edge 29E of the colored ceramic layer 29 and the edge 240E of the film 240 can be prevented from approaching each other, and the distortion of the HUD image and a reflected double image can be reduced.

Practical Examples 1 to 13 and Comparative Example 1

Glass plates 210 and 220 were provided. Intermediate films 231 and 232, including a film 240 arranged in between, were held between the glass plates 210 and 220, and glass laminates according to practical examples 1 to 13 and comparative example 1 were prepared.

For the glass plates 210 and 220, float plate glasses (by AGC Inc., known as FL) were used. The dimensions of the glass plates 210 and 220 were set to be 300 mm×300 mm×thickness 2 mm. Moreover, the respective glass plates were bend-formed by heating. For the intermediate film 231, a PVB (by Eastman Chemical Company) with a thickness of 0.38 mm was used. For the intermediate film 232, a PVB (by Eastman Chemical Company) with a thickness of 0.83 mm was used. For the film 240, a high reflectivity film, which was a PET film with a dimension of 300 mm×200 mm subjected to a titania coating, was used. The laminated glass was prepared by laminating the glass plate 210, the intermediate film 231, the film 240, the intermediate film 232, and the glass plate 220, in this order. The film 240 was arranged in a central part of the laminated glass. In a HUD display area, a curvature radius in the vertical direction of the laminated glass was 5000 mm, and the curvature radius in the horizontal direction was 2000 mm.

In practical example 1, a thickness of the film 240 was set to be 100 μm, a distance e between an edge 240E of the film 240 and the HUD display area $R_1$ was set to be 5 mm, a wedge angle of the film 240 at a point on the film 240 located at a distance of e from the edge 240E was set to be 1.94 mrad.

In practical example 2, the thickness of the film 240 was set to be 100 μm, the distance e between the edge 240E of the film 240 and the HUD display area $R_1$ was set to be 10 mm, the wedge angle of the film 240 at the point on the film 240 located at the distance of e from the edge 240E was set to be 1.82 mrad.

In practical example 3, the thickness of the film 240 was set to be 100 μm, the distance e between the edge 240E of the film 240 and the HUD display area $R_1$ was set to be 15 mm, the wedge angle of the film 240 at the point on the film 240 located at the distance of e from the edge 240E was set to be 1.69 mrad.

In practical example 4, the thickness of the film 240 was set to be 100 μm, the distance e between the edge 240E of the film 240 and the HUD display area $R_1$ was set to be 20 mm, the wedge angle of the film 240 at the point on the film 240 located at the distance of e from the edge 240E was set to be 1.30 mrad.

In practical example 5, the thickness of the film 240 was set to be 100 μm, the distance e between the edge 240E of the film 240 and the HUD display area $R_1$ was set to be 25 mm, the wedge angle of the film 240 at the point on the film 240 located at the distance of e from the edge 240E was set to be 0.80 mrad.

In practical example 6, the thickness of the film 240 was set to be 75 μm, the distance e between the edge 240E of the film 240 and the HUD display area $R_1$ was set to be 5 mm, the wedge angle of the film 240 at the point on the film 240 located at the distance of e from the edge 240E was set to be 1.44 mrad.

In practical example 7, the thickness of the film 240 was set to be 75 μm, the distance e between the edge 240E of the film 240 and the HUD display area $R_1$ was set to be 10 mm, the wedge angle of the film 240 at the point on the film 240 located at the distance of e from the edge 240E was set to be 1.37 mrad.

In practical example 8, the thickness of the film 240 was set to be 75 μm, the distance e between the edge 240E of the film 240 and the HUD display area $R_1$ was set to be 15 mm, the wedge angle of the film 240 at the point on the film 240 located at the distance of e from the edge 240E was set to be 1.29 mrad.

In practical example 9, the thickness of the film 240 was set to be 75 μm, the distance e between the edge 240E of the film 240 and the HUD display area $R_1$ was set to be 20 mm, the wedge angle of the film 240 at the point on the film 240 located at the distance of e from the edge 240E was set to be 1.02 mrad.

In practical example 10, the thickness of the film 240 was set to be 50 μm, the distance e between the edge 240E of the film 240 and the HUD display area $R_1$ was set to be 5 mm, the wedge angle of the film 240 at the point on the film 240 located at the distance of e from the edge 240E was set to be 0.81 mrad.

In practical example 11, the thickness of the film 240 was set to be 50 μm, the distance e between the edge 240E of the film 240 and the HUD display area $R_1$ was set to be 10 mm, the wedge angle of the film 240 at the point on the film 240 located at the distance of e from the edge 240E was set to be 0.80 mrad.

In practical example 12, the thickness of the film 240 was set to be 50 μm, the distance e between the edge 240E of the film 240 and the HUD display area $R_1$ was set to be 15 mm, the wedge angle of the film 240 at the point on the film 240 located at the distance of e from the edge 240E was set to be 0.79 mrad.

In practical example 13, the thickness of the film 240 was set to be 50 μm, the distance e between the edge 240E of the film 240 and the HUD display area $R_1$ was set to be 20 mm, the wedge angle of the film 240 at the point on the film 240 located at the distance of e from the edge 240E was set to be 0.71 mrad.

In comparative example 1, the thickness of the film 240 was set to be 100 μm, the distance e between the edge 240E of the film 240 and the HUD display area $R_1$ was set to be 3 mm, the wedge angle of the film 240 at the point on the film 240 located at the distance of e from the edge 240E was set to be 2.01 mrad.

For each of practical examples 1 to 13 and comparative example 1, an image from a projector was projected onto the laminated glass near the edge 240E of the film 240 via the concave mirror as an HUD image, and the distortion of the HUD image and the reflected double image were evaluated.

The evaluation of the distortion of the HUD image was performed by determining, in the case where a horizontal line with a width of 0.034 degrees (equivalent to 10 min) was projected beyond the laminated glass by 2 m, whether an observer saw a winding of the horizontal line and felt uncomfortable about visibility by eyes. When an observer did not feel uncomfortable, the result of the evaluation was set to "good". When the observer felt uncomfortable, the result of the evaluation was set to "poor".

The evaluation of the reflected double image was performed by determining, in the case where a horizontal line with a width of 0.17 degrees (equivalent to 10 min) was projected beyond the laminated glass by 2 m, whether the observer observed a reflective double image and felt uncomfortable about visibility by eyes. When the observer did not feel uncomfortable at all, the result of the evaluation was set to "good". When the observer did not feel uncomfortable, the result of the evaluation was set to "fair". When the observer felt uncomfortable, the result of the evaluation was set to "poor".

Figure 7:
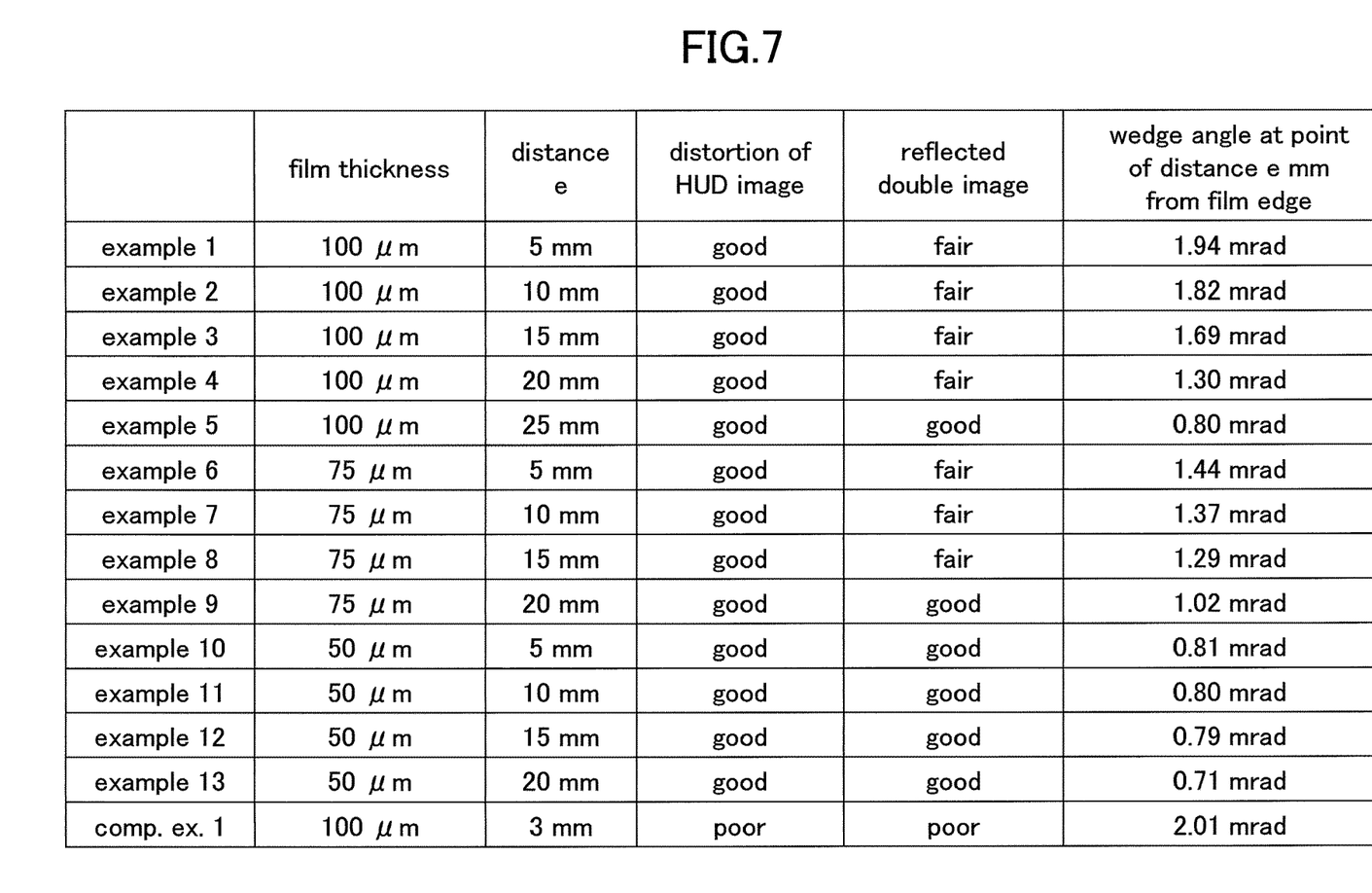
FIG. 7 is a diagram for explaining practical examples and comparative example.

The results of evaluation for practical examples 1 to 13 and comparative example are summarized in FIG. 7.

As shown in FIG. 7, in any of practical examples 1 to 13, the observer did not feel uncomfortable about the distortion of the HUD image. Moreover, in any of practical examples 1 to 13, the observer did not feel uncomfortable at all or did not feel uncomfortable about the reflected double image. Particularly, as the distance e becomes greater, or as the thickness of the film 240 becomes thinner, the results dramatically improved.

In practical examples 1 to 13, the distortion of the HUD image and the reflected double image are considered to be reduced, because the HUD display area $R_1$ was arranged in a region inside by 5 mm from the edge 240E of the film 240, and the HUD image was projected avoiding a region, in which a shape and a thickness of the laminated glass varied near the edge 240E of the film 240. Moreover, it is considered that as the thickness of the film 240 became thinner, waviness was less likely to occur, and thus for the reflected double image, better results were obtained.

In contrast, in comparative example 1, the observer felt uncomfortable about the distortion of the HUD image and the reflected double image. In comparative example 1, the distance from the edge 240E of the film 240 to the HUD display area $R_1$ was 3 mm, and the HUD image was projected in the region, in which the shape and the thickness of the laminated glass varied near the edge 240E of the film 240, thus, the distortion of the HUD image and the reflected double image were considered to become worse.

In this way, by arranging the HUD display area $R_1$ in the region inside by 5 mm from the edge 240E of the film 240, it becomes possible to avoid the region, in which a shape and a thickness of the laminated glass vary near the edge 240E of the film 240, thus, the distortion of the HUD image and the reflected double image can be reduced.

Practical Examples 14 to 25 and Comparative Example 2

Glass plates 210 and 220 were provided. Intermediate films 231 and 232, including a film 240 arranged in between, were held between the glass plates 210 and 220, and laminated glasses according to practical examples 14 to 25 and comparative example 2 were prepared.

The dimension of the glass plates 210 and 220, materials and film thicknesses of the intermediate films 231 and 232, a dimension and a type of the film 240 and curvature radii of the laminated glass in the vertical direction and the horizontal direction were the same as those in practical examples 1 to 13 and comparative example. In comparative examples 14 to 25, and comparative example 2, a colored ceramic layer 29 is formed in a band shape region with a width of 100 mm in a lower part of the vehicle interior side surface of the glass plate 210, i.e. the glass plate assuming the vehicle interior side.

In practical example 14, a thickness of the film 240 was set to be 100 μm, an amount of overlap d between the film 240 and the colored ceramic layer 29 was set to be 15 mm, and a wedge angle of an end part of the colored ceramic layer 29 was set to be 1.45 mrad.

In practical example 15, the thickness of the film 240 was set to be 100 μm, the amount of overlap d between the film 240 and the colored ceramic layer 29 was set to be 30 mm, and the wedge angle of the end part of the colored ceramic layer 29 was set to be 0.71 mrad.

In practical example 16, the thickness of the film 240 was set to be 100 μm, the amount of overlap d between the film 240 and the colored ceramic layer 29 was set to be 50 mm, and the wedge angle of the end part of the colored ceramic layer 29 was set to be 0.23 mrad.

In practical example 17, the thickness of the film 240 was set to be 100 μm, the amount of overlap d between the film 240 and the colored ceramic layer 29 was set to be 100 mm, and the wedge angle of the end part of the colored ceramic layer 29 was set to be 0.12 mrad.

In practical example 18, the thickness of the film 240 was set to be 75 μm, the amount of overlap d between the film 240 and the colored ceramic layer 29 was set to be 15 mm, and the wedge angle of the end part of the colored ceramic layer 29 was set to be 1.21 mrad.

In practical example 19, the thickness of the film 240 was set to be 75 μm, the amount of overlap d between the film 240 and the colored ceramic layer 29 was set to be 30 mm, and the wedge angle of the end part of the colored ceramic layer 29 was set to be 0.59 mrad.

In practical example 20, the thickness of the film 240 was set to be 75 μm, the amount of overlap d between the film 240 and the colored ceramic layer 29 was set to be 50 mm, and the wedge angle of the end part of the colored ceramic layer 29 was set to be 0.19 mrad.

In practical example 21, the thickness of the film 240 was set to be 75 μm, the amount of overlap d between the film 240 and the colored ceramic layer 29 was set to be 100 mm, and the wedge angle of the end part of the colored ceramic layer 29 was set to be 0.10 mrad.

In practical example 22, the thickness of the film 240 was set to be 50 μm, the amount of overlap d between the film 240 and the colored ceramic layer 29 was set to be 15 mm, and the wedge angle of the end part of the colored ceramic layer 29 was set to be 0.79 mrad.

In practical example 23, the thickness of the film 240 was set to be 50 μm, the amount of overlap d between the film 240 and the colored ceramic layer 29 was set to be 30 mm, and the wedge angle of the end part of the colored ceramic layer 29 was set to be 0.39 mrad.

In practical example 24, the thickness of the film 240 was set to be 50 μm, the amount of overlap d between the film 240 and the colored ceramic layer 29 was set to be 50 mm, and the wedge angle of the end part of the colored ceramic layer 29 was set to be 0.13 mrad.

In practical example 25, the thickness of the film 240 was set to be 50 μm, the amount of overlap d between the film 240 and the colored ceramic layer 29 was set to be 100 mm, and the wedge angle of the end part of the colored ceramic layer 29 was set to be 0.07 mrad.

In comparative example 2, the thickness of the film 240 was set to be 100 μm, the amount of overlap d between the film 240 and the colored ceramic layer 29 was set to be 10 mm, and the wedge angle of the end part of the colored ceramic layer 29 was set to be 2.15 mrad.

For each of practical examples 14 to 25 and comparative example 2, a HUD image was projected onto the laminated glass at a site which is separated upward from the lower edge of the colored ceramic layer 29 by 30 mm by using a concave mirror, and the distortion of the HUD image and the reflected double image were evaluated. The evaluation method for practical examples 14 to 25 and comparative example 1 was the same as that for practical examples 1 to 13 and comparative example 1.

Figure 8:
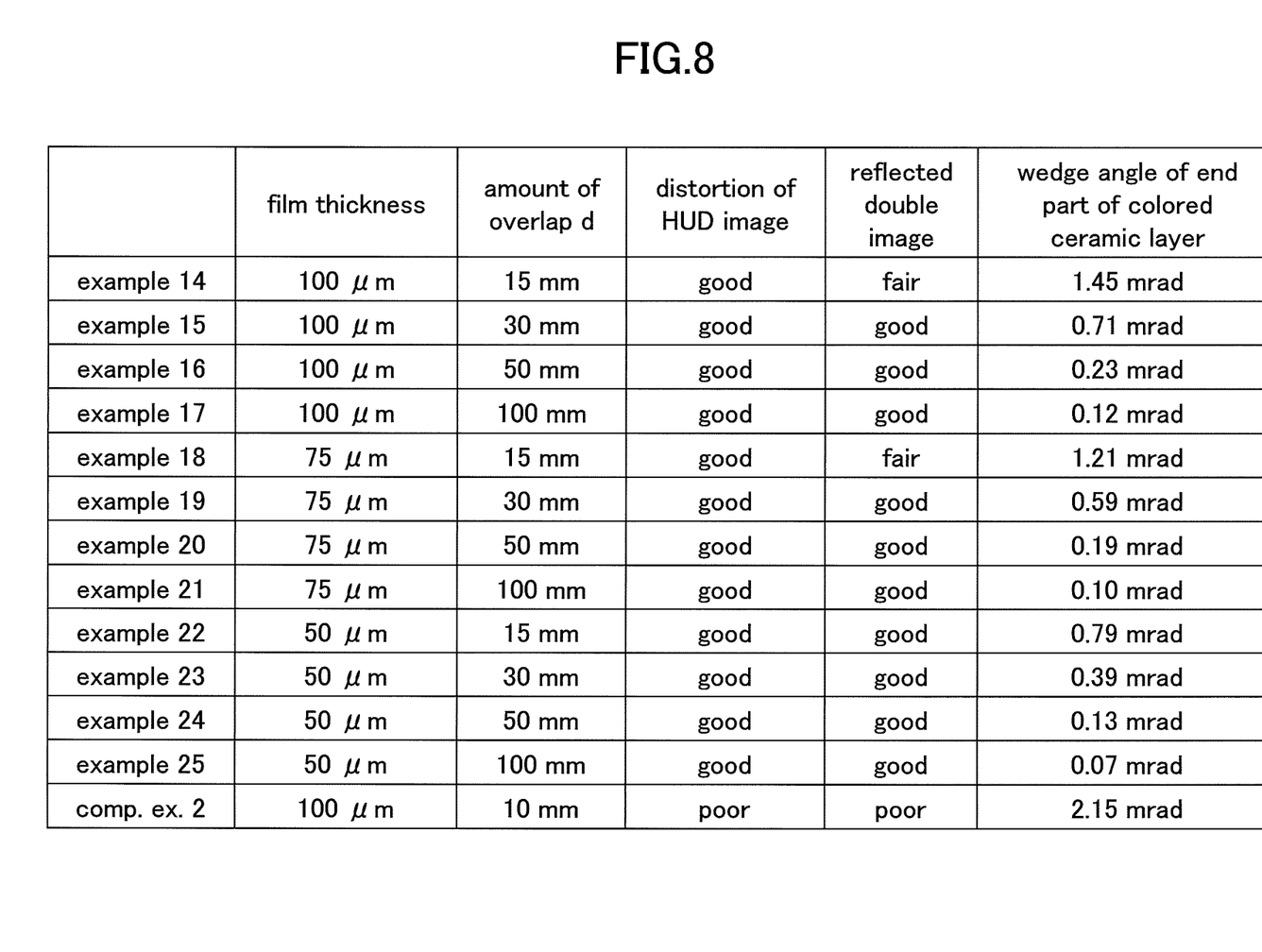
FIG. 8 is another diagram for explaining practical examples and comparative example.

The results of evaluation for practical examples 14 to 25 and comparative example 2 are summarized in FIG. 8.

As shown in FIG. 8, in any of practical examples 14 to 25, the observer did not feel uncomfortable about the distortion of the HUD image. Moreover, in any of practical examples 14 to 25, the observer did not feel uncomfortable at all or did not feel uncomfortable about the reflected double image. Particularly, as the amount of overlap d becomes greater, or as the thickness of the film 240 becomes thinner, better results were obtained.

In practical examples 14 to 25, the distortion of the HUD image and the reflected double image are considered to be reduced, because the amount of overlap d between the film 240 and the colored ceramic layer 29 was 15 mm or more, and thereby the edge 29E of the colored ceramic layer 29 and the edge 240E of the film 240 were prevented from approaching each other. Moreover, it is considered that as the thickness of the film 240 became thinner, waviness was less likely to occur, and thus for the reflected double image, better results were obtained.

On the other hand, in comparative example 2, the observer felt uncomfortable about the distortion of the HUD image and the reflected double image. In comparative example 2, the amount of overlap between the film 240 and the colored ceramic layer 29 was 10 mm, and the edge 29E of the colored ceramic layer 29 and the edge 240E of the film 240 could not be sufficiently prevented from approaching each other, thus, the distortion of the HUD image and the reflected double image were considered to become worse.

In this way, by setting the amount of overlap d between the film 240 and the colored ceramic layer 29 to be 15 mm or more, the edge 29E of the colored ceramic layer 29 and the edge 240E of the film 240 can be prevented from approaching each other, thus, the distortion of the HUD image and the reflected double image can be reduced.

As described above, embodiments and the like have been described in detail. The present invention is not limited to the embodiments or the like. Various variations and enhancements, such as combination/replacement may be made without departing from the scope of the present invention.

REFERENCE SIGNS LIST 20 front windshield
21 inner surface
22 outer surface
29 colored ceramic layer
29E edge of colored ceramic layer
210,220 glass plate
230,231,232 intermediate film
240 film
240E edge of film R₁ HUD display area
R₂ region outside the HUD display area

What is claimed is:

1. A laminated glass comprising:
a vehicle exterior side glass plate;
a vehicle interior side glass plate;
an intermediate film disposed between the vehicle exterior side glass plate and the vehicle interior side glass plate;
a display area for reflecting a projected image projected from a vehicle interior to display information, wherein the display area is a region of the laminated glass which is irradiated with light from a mirror of a vehicle-mounted head-up display (HUD) when the mirror of the HUD is rotated and viewed from a V1 point defined in JIS standard R3212; and
a functional film arranged in at least a part of the display area and between the vehicle exterior side glass plate and the vehicle interior side glass plate,
wherein the functional film is a main reflection surface for the projected image, and
wherein the display area is offset from an edge of the functional film by a distance e of at least 5 mm,
wherein the distance e mm between the display area and the edge of the functional film and a thickness t mm of the functional film satisfy equation (1)

$$40 > e \geq 5 \text{ and } t \leq \frac{4l^3}{3} \frac{\delta}{l^2 - e^2}, \quad (1)$$

where:
l is a distance from the edge of the functional film to a part where a variation in thickness of the laminated glass does not occur, the distance l is set to 40 mm, and
δ is a wedge angle of the laminated glass, the wedge angle δ is set to 0.0012 rad.

2. The laminated glass according to claim 1,
wherein the display area is offset from the edge of the functional film by at least 10 mm.

3. The laminated glass according to claim 2,
wherein the display area is offset from the edge of the functional film by at least 15 mm.

4. The laminated glass according to claim 1,
wherein the laminated glass has a curvature in the display area, a curvature radius in a vertical direction when the laminated glass is mounted to a vehicle is 4000 mm or more and 20000 mm or less, and a curvature radius in a horizontal direction when the laminated glass is mounted to the vehicle is 1000 mm or more and 10000 mm or less.

5. The laminated glass according to claim 1,
wherein a thickness of the functional film is 25 μm or more to 200 μm or less.

6. The laminated glass according to claim 1,
wherein the functional film is a P polarized light reflection film, and
wherein a reflectance of P polarized light, in a state where the functional film is laminated in the laminated glass, at an incident angle that is a Brewster angle, is 5% or more.

7. The laminated glass according to claim 1,
wherein the functional film is a transparent screen of a scattering reflection system.

8. The laminated glass according to claim 1,
wherein a field of view for the projected image is 4 deg×1 deg or more.

9. The laminated glass according to claim 1, wherein the display area is positioned within a region defined by the functional film.

10. A laminated glass comprising:
a vehicle exterior side glass plate;
a vehicle interior side glass plate;
an intermediate film disposed between the vehicle exterior side glass plate and the vehicle interior side glass plate;
a functional film arranged in the intermediate film and between the vehicle exterior side glass plate and the vehicle interior side glass plate, the functional film being a main reflection surface for a projected image projected from a vehicle interior to display information;
a display area for reflecting the projected image, wherein the display area is a region of the laminated glass which is irradiated with light from a mirror of a vehicle-mounted head-up display (HUD) when the mirror of the HUD is rotated and viewed from a V1 point defined in JIS standard R3212; and
a colored ceramic layer arranged over a peripheral portion of the laminated glass,
wherein the functional film has a region that overlaps with the colored ceramic layer in a planar view,
wherein an amount of overlap of the region, in which the functional film and the colored ceramic layer overlap with each other, in a direction from an inner peripheral portion to an outer peripheral portion of the colored ceramic layer is 15 mm or more,
wherein the functional film is arranged in at least a part of the display area, and
wherein the display area is offset from an edge of the functional film by at least 5 mm.

11. The laminated glass according to claim 10,
wherein the amount of overlap is 30 mm or more.

12. The laminated glass according to claim 10,
wherein the amount of overlap d mm and a thickness t mm of the functional film satisfy equation (2)

$$40 > d \geq 15 \text{ and } t \leq \frac{4l^3}{3} \frac{\delta}{l^2 - d^2}, \quad (2)$$

where:
l is a distance from the edge of the functional film to a part, where a variation in thickness of the laminated glass does not occur, the distance l is set to 40 mm, and
δ is a wedge angle of the laminated glass, the wedge angle δ is set to 0.001 rad.

13. The laminated glass according to claim 10,
wherein in a state where the laminated glass is mounted to a vehicle, a lower side portion of the functional film overlaps with the colored ceramic layer in a planar view.

14. The laminated glass according to claim 10,
wherein in a state where the laminated glass is mounted to a vehicle, an upper side portion of the functional film overlaps with the colored ceramic layer in a planar view.

15. The laminated glass according to claim 10,
wherein in a state where the laminated glass is mounted to a vehicle, a lateral side portion of the functional film overlaps with the colored ceramic layer in a planar view.

16. The laminated glass according to claim 10,
wherein the colored ceramic layer is arranged on one of or both a vehicle interior side surface of the vehicle interior side glass plate and a vehicle interior side surface of the vehicle exterior side glass plate.

* * * * *